(12) United States Patent
Carasso

(10) Patent No.: US 10,984,456 B2
(45) Date of Patent: *Apr. 20, 2021

(54) SYSTEMS AND METHODS TO BYPASS ONLINE ADVERTISEMENT BLOCKERS

(71) Applicant: ADSUPPLY, INC., Culver City, CA (US)

(72) Inventor: Adam Carasso, Santa Monica, CA (US)

(73) Assignee: AdSupply, Inc., Culver City, CA (US)

(*) Notice: Subject to any disclaimer, the term of this patent is extended or adjusted under 35 U.S.C. 154(b) by 1213 days.

This patent is subject to a terminal disclaimer.

(21) Appl. No.: 14/879,293

(22) Filed: Oct. 9, 2015

(65) Prior Publication Data

US 2016/0063578 A1    Mar. 3, 2016

Related U.S. Application Data

(63) Continuation of application No. 14/474,216, filed on Sep. 1, 2014, now Pat. No. 9,177,335.

(51) Int. Cl.
*G06F 16/957* (2019.01)
*G06Q 30/02* (2012.01)
(Continued)

(52) U.S. Cl.
CPC ....... *G06Q 30/0277* (2013.01); *G06F 16/957* (2019.01); *H04L 63/029* (2013.01);
(Continued)

(58) Field of Classification Search
CPC ............ G06F 16/957; G06F 16/30899; H04L 61/1511; H04L 63/029; H04L 63/062; H04L 63/123; H04L 67/02; H04L 67/20; H04L 67/28; H04L 61/306; H04L 63/0245; H04L 63/0428; H04L 67/2814; G06Q 30/0277
(Continued)

(56) References Cited

U.S. PATENT DOCUMENTS 7,058,633 B1 *  6/2006  Gnagy et al.
9,177,335 B1 * 11/2015  Carasso
(Continued)

*Primary Examiner* — James D Nigh
*Assistant Examiner* — Yin Y Choi
(74) *Attorney, Agent, or Firm* — Ansari Katiraei LLP; Arman Katiraei; Sadiq Ansari

(57) ABSTRACT

Some embodiments provide an adblocking bypass system for ensuring that advertisements are loaded and presented on a user device running one or more adblockers. The adblocking bypass system is comprised of a bypass loader and a bypass proxy. The bypass loader is a component that is embedded within content publisher content. When the content publisher content is downloaded and parsed by a user device, the bypass loader executes by detecting the presence of any adblocker on the user device. If found, the bypass loader forwards any blocked advertisement calls to the bypass proxy. The bypass proxy retrieves the requested advertisements and returns them to the bypass loader which then reintroduces the advertisements in final content presentation or rendering. The bypass proxy may also modify the content publisher content by replacing any blocked advertisement calls embedded within the content with calls to the bypass proxy.

17 Claims, 7 Drawing Sheets

(51) Int. Cl.
*H04L 29/06* (2006.01)
*H04L 29/08* (2006.01)
*H04L 29/12* (2006.01)

(52) U.S. Cl.
CPC .......... *H04L 63/062* (2013.01); *H04L 63/123* (2013.01); *H04L 67/02* (2013.01); *H04L 67/20* (2013.01); *H04L 67/28* (2013.01); *H04L 61/306* (2013.01); *H04L 63/0245* (2013.01); *H04L 63/0428* (2013.01); *H04L 67/2814* (2013.01)

(58) Field of Classification Search
USPC ........................................................ 705/50
See application file for complete search history.

(56) References Cited

U.S. PATENT DOCUMENTS

| | | |
|---|---|---|
| 9,679,315 B2 * | 6/2017 | Carasso |
| 2008/0263353 A1 * | 10/2008 | Droms et al. |
| 2008/0289049 A1 * | 11/2008 | Morris et al. |
| 2009/0287572 A1 | 11/2009 | Whelan |
| 2011/0107077 A1 * | 5/2011 | Henderson et al. |
| 2011/0131567 A1 | 6/2011 | Tirk et al. |
| 2011/0252160 A1 * | 10/2011 | Wu |
| 2012/0124372 A1 * | 5/2012 | Dilley et al. |
| 2013/0311863 A1 * | 11/2013 | Gutkin et al. |
| 2014/0090073 A1 * | 3/2014 | Clift et al. |
| 2014/0150019 A1 * | 5/2014 | Ma et al. |
| 2015/0234892 A1 * | 8/2015 | Malca |

* cited by examiner

SYSTEMS AND METHODS TO BYPASS ONLINE ADVERTISEMENT BLOCKERS

CLAIM OF BENEFIT TO RELATED APPLICATIONS

This application is a continuation of U.S. nonprovisional application Ser. No. 14/474,216 entitled "Systems and Methods to Bypass Online Advertisement Blockers", filed Sep. 1, 2014. The contents of application Ser. No. 14/474, 216 are hereby incorporated by reference.

TECHNICAL FIELD

The present invention is directed to online advertisement systems and, more particularly, to systems and methods for counteracting online advertisement blockers that run on user devices.

BACKGROUND ART

Online advertising is an important revenue stream for many publishers of online content. Online advertising is also an important means through which different entities, products, and services generate goodwill, brand recognition, and customer loyalty as well as promote and disseminate information about those entities, products, and services.

Online advertisement can be in the form of banner, pop-up, embedded, in-line, interstitial, and full page canvas advertisements that are presented when a user visits a page, navigates away from a page, closes a page, or is otherwise directed to a page or an advertisement. The advertisements can be provided as links, audio content, or visual content including text, images, and other multimedia content.

Advertisement blocking tools, also referred to herein as adblockers, operate to block the display and, in some cases, the loading of online advertisements on websites, such as HyperText Markup Language (HTML) pages, and other downloadable content. Adblockers can be software applications, browser components, extensions, add-ons, scripts, or any service that operates in conjunction with a web browsing application, such as Chrome, Internet Explorer, and Firefox, for the purpose of blocking the display and/or loading of online advertisements.

Adblockers operate by intercepting calls to advertisements within content or preventing the advertisements from loading as part of the content. Typically, adblockers identify the advertisement calls that are to be intercepted using various blacklists. The blacklists may specify links or classes that identify various servers, services, or sources of advertisements. The blacklisted links include Uniform Resource Locators (URLs), other hyperlinks, or addressing to known advertisements or advertising providers. The blacklisted classes include function calls, scripting language, and other code that are used to embed advertisements within content. Adblockers may also block specific Cascade Style Sheet (CSS) selectors, CSS styles, and HTML elements from loading or being included as part of the content presentation. These and many other techniques may be used by different adblockers, but their objective is the same, to prevent the display or loading of advertisements that are embedded within online content.

Adblockers therefore prevent the presentation of content as originally intended by the originating content publisher. In so doing, adblockers deprive the content publisher of advertising revenue and also prevent the marketing, promotion, and information dissemination of entities, products, and services. Accordingly, there is a need to counteract the effect of adblockers and ensure that content is presented on the user device in the manner intended by the originating online content publisher.

SUMMARY OF THE INVENTION

It is an objective of the embodiments described herein to load and display advertisements as originally configured in online content publisher content, even when one or more adblockers execute on the user device. To achieve these and other objectives, some embodiments provide an adblocking bypass system.

The adblocking bypass system is comprised of a bypass loader and a bypass proxy. The bypass loader is a component that is embedded within content publisher content. The bypass loader is configured to run after the operation of any adblockers and reverse or counteract adblocker operation, thereby ensuring that advertisements configured as part of the content will be loaded and presented on the user device. In some embodiments, the bypass loader is configured to run after firing or execution of the load or onload event on the user device parsing and rendering the content.

When executed, the bypass loader detects presence of an adblocker running on the user device. In some embodiments, detection involves attempting to load an advertisement that is itself tracked or contains a trackable resource. If the tracked advertisement or resource is not present after the onload event, then the bypass loader determines that an adblocker is running on the user device.

If an adblocker is not detected on the user device, the bypass loader terminates and the user device processes, renders, and presents the content without modification. If the bypass loader detects presence of an adblocker, the bypass loader dynamically disguises the advertisement calls within the content to avoid having the calls match entries within the adblocker's blacklist. Specifically, the bypass loader uses a cipher to encrypt or otherwise obfuscate the domain name, hostname, Uniform Resource Locator (URL), or other address or request of the advertisement call. The bypass loader appends the cipher key used for the obfuscation to the obfuscated advertisement call. In some embodiments, the bypass loader also performs a base32 encoding of the obfuscated advertisement call to ensure it is formatted as a proper URL query. The bypass loader then passes the obfuscated advertisement call containing the encrypted original advertisement call and the cipher key used to perform the encryption to the bypass proxy. To ensure that the obfuscated advertisement call passing to the bypass proxy is not blocked by an adblocker, some embodiments periodically change the address (e.g., domain name) of the bypass proxy. The change can be performed automatically using a hash of a key or timestamp to generate the new address or domain name with a concerted action occurring at the bypass proxy to change routing or Domain Name System (DNS) configurations accordingly.

The bypass proxy is a hosted service that runs on a remote machine operating independent of the user device. The bypass proxy receives the obfuscated advertisement calls from the different bypass loader instances running on different user devices and reverses the obfuscation operations performed by the bypass loaders. For a specific obfuscated advertisement call, the bypass proxy decodes the base32 encoding, extracts the appended cipher key, and uses the cipher key to decrypt the original advertisement call. The bypass proxy then retrieves the advertisement from the corresponding advertisement server identified by the original advertisement call before forwarding the advertisement back to the appropriate bypass loader. To preserve the advertisers ability to track each user device with cookies or other means, the bypass proxy may include various header parameters including the user device IP address in the request to the advertisement server. Similarly, the header of the advertisement server response containing the requested advertisement may be parsed by the bypass loader to forward any tracking information or other relevant header parameters to the user device.

Upon receiving a forwarded advertisement from the bypass proxy, the bypass loader reintroduces the advertisement into the final presentation or rendering of the content. In some embodiments, the bypass loader reintroduces the advertisement by manipulating the Document Object Model (DOM) of the content rendering application running on the user device.

To avoid repeating these operations, in some embodiments, the bypass proxy modifies the content publisher content hosted on the remote site so that the original advertisement calls are replaced with the obfuscated advertisement calls. In other words, the bypass proxy rewrites the advertisement calls in the original content with addressing of the bypass proxy instead of addressing of the corresponding advertisement servers, wherein the addressing of the corresponding advertisement servers may be encrypted and/or included as part of the rewritten advertisement calls in some embodiments.

BRIEF DESCRIPTION OF THE DRAWINGS

In order to achieve a better understanding of the nature of the present invention, preferred embodiments for the adblocking bypass system will now be described, by way of example only, with reference to the accompanying drawings in which.

DETAILED DESCRIPTION

In the following detailed description, numerous details, examples, and embodiments for the adblocking bypass system are set forth and described. The adblocking bypass system is not limited to the embodiments set forth, and it may be practiced without some of the specific details and examples discussed. Also, reference is made to the accompanying figures, which illustrate specific embodiments in which the adblocking bypass system can be practiced. It is to be understood that other embodiments can be used and structural changes can be made without departing from the scope of the embodiments herein described.

Figure 1:
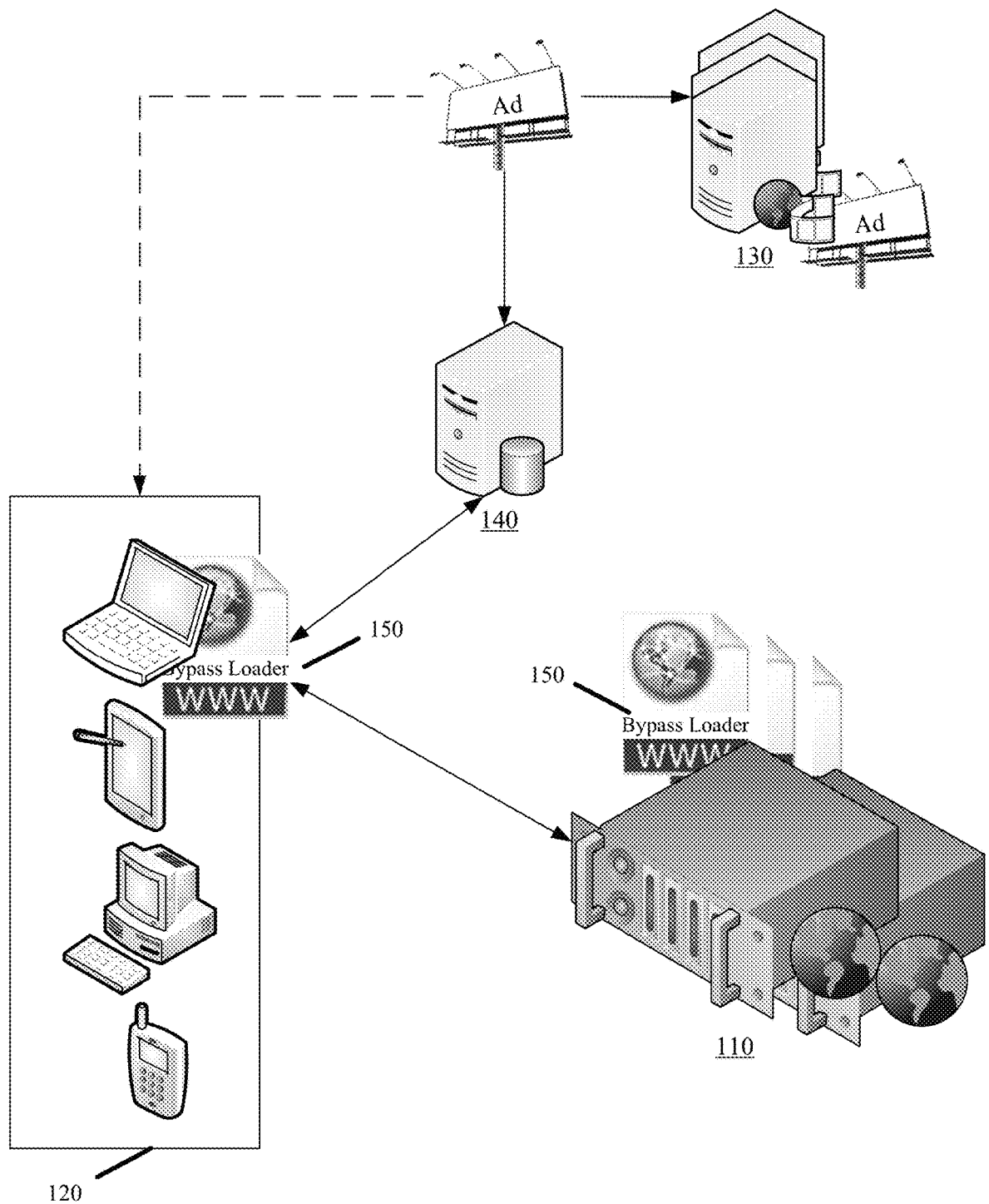
FIG. 1 illustrates the operating environment of the adblocking bypass system in accordance with some embodiments.

FIG. 1 illustrates the operating environment of the adblocking bypass system in accordance with some embodiments. Depicted as part of the operating environment are various content publishers 110, user devices 120, advertisement servers 130, and the adblocking bypass system comprised of the bypass proxy 140 and various bypass loaders 150.

Content publishers 110 originate content for consumption by the user devices 120. Content is a general term referring to any web site, text, document, file, media, application, service, or game that is digitally encoded and is deliverable across a network, such as the Internet. Content itself can be composed of content sub-components, wherein the sub-components may be provided by the same content publisher or other content publishers. For instance, content may be embedded with images provided by a first content publisher, a service provided by a second content publisher, and advertisements provided by one or more advertisement servers. In FIG. 1, the content publishers 110 are shown to operate one or more servers that host and deliver their content. However as is well known in the art, content publisher originated content can be hosted and served from other sources including content delivery networks (CDNs), cloud service providers, and caching or proxy servers operated by others independent of the content publishers 110.

Figure 7:
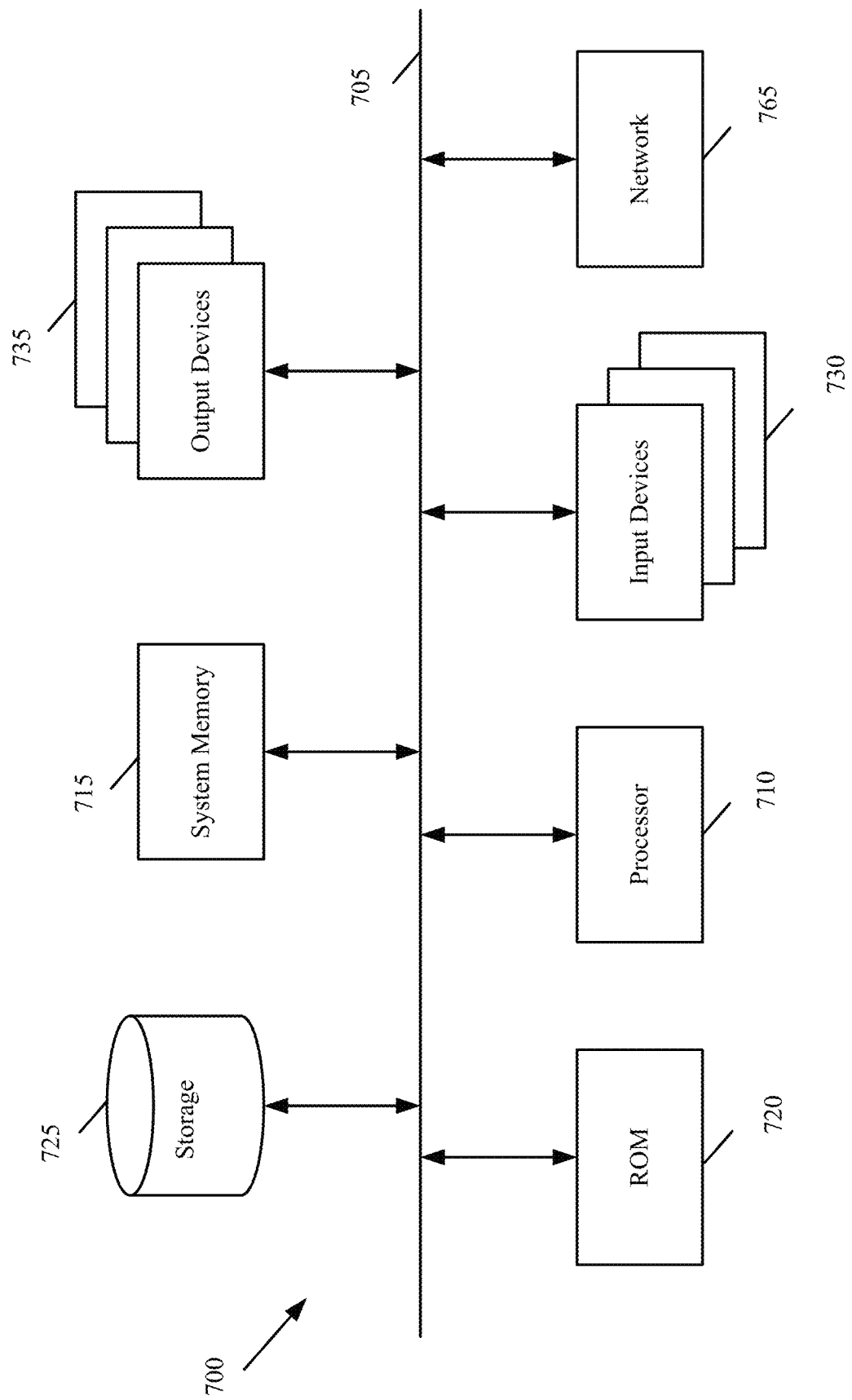
FIG. 7 illustrates a computer system or server with which some embodiments are implemented.

The user devices 120 include any device with a processor that runs a content processing, rendering, or presenting application. The user device can include any of a laptop computer, smartphone, tablet, and desktop computing machine as some examples. The most common application for processing, rendering, or presenting the content is a web browsing application (e.g., Internet Explorer, Firefox, Chrome, and Safari web browsers), although other applications running on the user device 120 can similarly process, render, or present the content publisher content. For the purposes of the discussion that it to follow, one or more adblockers are installed on the user devices 120 and running in conjunction with the content retrieval or content rendering application of the user devices 120. AdBlock and AdBlock Plus are examples of adblockers. As noted in the background section, the purpose of the adblockers is to block the display and/or loading of online advertisements that are embedded as part of the content being presented on a user device. FIG. 7 illustrates various components of the user devices 120, servers for the content publisher content, and the adblocking bypass system.

Advertisement servers 130 are machines that host and deliver various advertisements that are embedded within the content publisher content. As earlier noted, the content publisher content may be configured with zero or more advertisement calls. When a user device receives and processes content with one or more advertisement calls, the user device will parse and invoke those advertisement calls in order to identify and retrieve the advertisements from the appropriate advertisement servers 130. The advertisements are then rendered or displayed as part of the content in the manner configured or specified within the content publisher content.

The collective operations of the bypass proxy 140 and the bypass loaders 150 counteract adblocker functionality and ensure that advertisements embedded as part of the content publisher content will be loaded and displayed on the user devices 120, even when the user devices 120 run one or more adblockers. In some embodiments, the bypass loaders 150 are embedded in content publisher content as server-side scripts that dynamically adapt in response to adblocker operation. As adblockers modify which advertisement calls they block, the bypass loader modifies the manner in which the advertisements associated with those advertisement calls are retrieved in order to evade the adblocker from blocking those advertisements. In some embodiments, the bypass loaders 150 are embodied as JavaScript, although other scripting languages or code can be used to implement the bypass loaders 150. In some embodiments, a call or function embedded within the content publisher content can be used to invoke a bypass loader 150 on a machine that is remote to the user device issuing the call or function. In some embodiments, the bypass loader 150 is configured to execute when or after the "load" or "onLoad" Document Object Model (DOM) or HyperText Markup Language (HTML) event fires. These events fire when a page, object, or entirety of the content has finished loading on the corresponding user device. More importantly, the events fire after adblocker execution is complete.

Each bypass proxy 140 is a service that is hosted by the adblocking bypass system. The bypass proxy 140 is a network accessible machine that operates independent of the user devices 120 and content publishers 110, although in some embodiments, the bypass proxy 140 functionality described below can be incorporated directly with content publisher resources. Incorporating the bypass proxy 140 functionality directly within servers or other resources (e.g., load balancers) of the content publishers 110 is preferable for adblockers that prevent user devices from issuing calls to any third party when rendering first party content. In other words, when rendering content from a particular content publisher, an adblocker may block any calls issued to any domain deviating from that of the particular content publisher.

Figure 2:
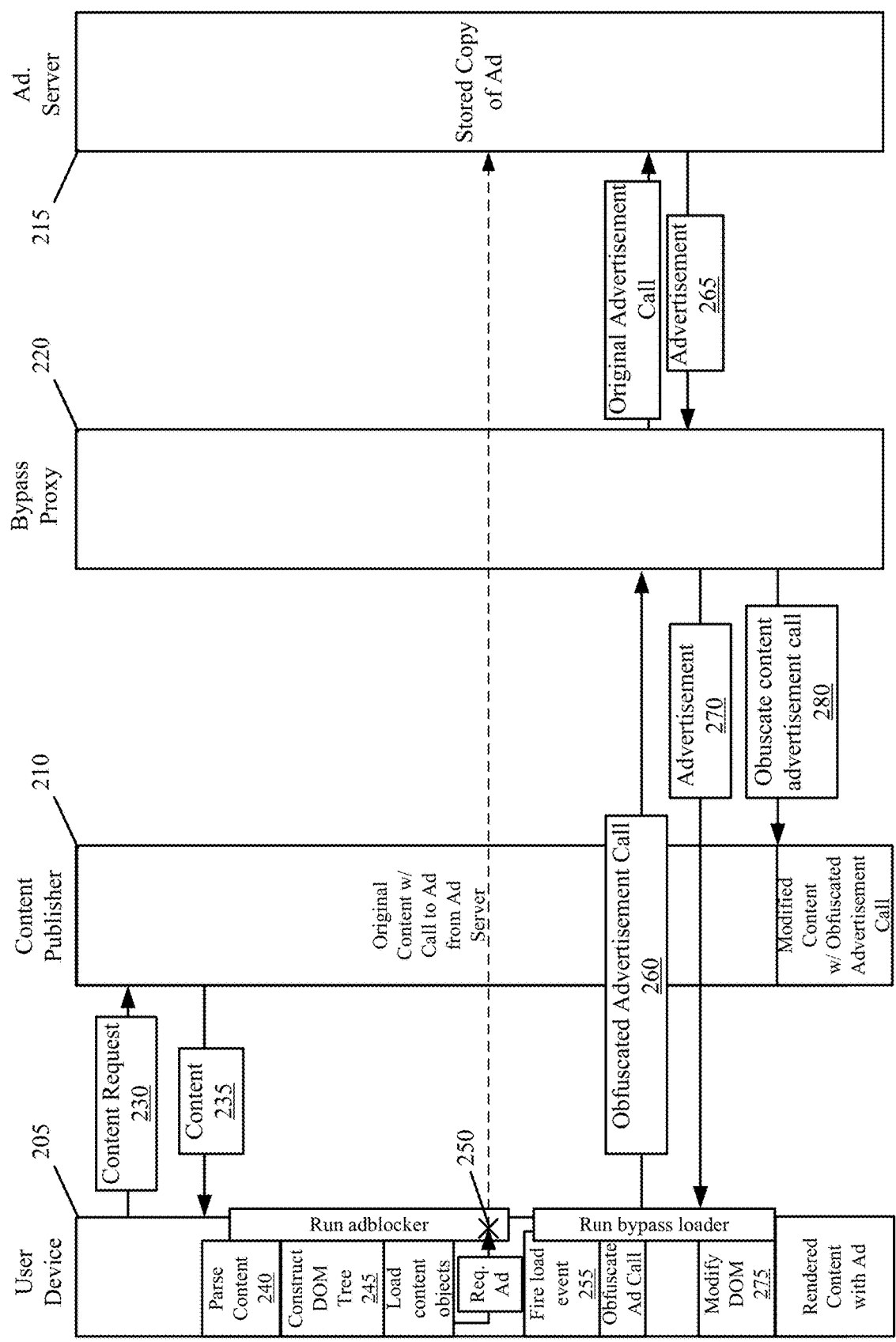
FIG. 2 presents a message exchange diagram illustrating operation of the adblocking bypass system in ensuring that advertisements are loaded and presented on a user device running one or more adblockers.

FIG. 2 presents a message exchange diagram illustrating operation of the adblocking bypass system in ensuring that advertisements are loaded and presented on a user device running one or more adblockers. In this figure, messages are exchanged between a user device 205, content publisher 210, advertisement server 215, and bypass proxy 220. The user device runs an adblocker in conjunction with a browsing application.

The message exchange commences when the user device 205 requests (at 230) content from the content publisher 210. The content publisher 210 content is embedded with the bypass loader of some embodiments. The content publisher 210 content is also embedded with at least one advertisement call that points to an advertisement that is hosted and served by the advertisement server 215. As an example, the advertisement call can be an "a href" HTML attribute with a link specifying an address of the advertisement server. The link can be a Uniform Resource Locator (URL) having a domain name or Internet Protocol (IP) address of the advertisement server, a directory path, and a filename of the advertisement. Different content publishers can use different advertisement call formatting, HTML elements, and scripts to issue the advertisement calls. In any event, once the advertisement call is issued, a URL or other address is used to request an advertisement from the appropriate advertisement server 130. In response to the user device 205 request, the content publisher 210 serves (at 235) the requested content with the at least one advertisement call and bypass loader to the user device 205.

The user device 205 or browsing application running on the user device begins by parsing (at 240) the content and constructing (at 245) the DOM hierarchy. Construction of the DOM hierarchy is well known in the art and an operation performed by most content browsing applications including web browsers. Generally, constructing the DOM hierarchy involves parsing the content into its various object components and producing a tree with nodes to represent the object components, style, and structure in a manner that is accessible through a standardized application programming interface (API).

While parsing the content and constructing the DOM hierarchy, the adblocker is invoked to intercept any advertisement calls that are embedded in the content and to prevent the advertisements requested by those calls from being loaded as part of the content. As shown, the adblocker intercepts and blocks (at 250) the advertisement call that attempts to retrieve an advertisement from the advertisement server 215. The adblocker may identify the advertisement call because the call specifies a URL, domain name, hostname, or other address that matches to an entry in the adblocker blacklist. The adblocker may also indirectly identify advertisement calls by blocking specific Cascade Style Sheet (CSS) selectors and HTML elements from being added to the DOM hierarchy. Specifically, the adblocker can intercept and prevent loading or display of advertisements by removing or hiding nodes from the DOM hierarchy that arise because of various advertisement calls. In such situations, the user device 205 may actually issue the advertisement calls with the adblocker later preventing them from being loaded or removing them once they are loaded as part of the content. Other adblockers may prevent the DOM hierarchy from being constructed with any advertisement related nodes. In such situations, the adblockers prevent the user device 205 from even issuing the advertisement calls to the corresponding advertisement server.

Once the content is parsed and the DOM hierarchy is constructed, the load event fires (at 255). The firing or completion of the load event triggers execution of the bypass loader that is also embedded as part of the content publisher content. The bypass loader detects for the presence of any adblocker running on the user device 205. The detection can be performed in any number of ways including attempting to load a specific advertisement tag that is itself tracked or contains a trackable resource. If an adblocker was running on the user device 205, the adblocker would remove or block that specific advertisement tag or trackable resource and the absence of which would indicate to the bypass loader that an adblocker is in fact running. The bypass loader then identifies the advertisement calls that were intercepted and blocked by the adblocker. In some embodiments, the bypass loader identifies the advertisement calls by scanning the content to look for addressing, links, or URLs to known advertisers or advertisement servers that are blacklisted by various adblockers. In some embodiments, the bypass loader identifies the advertisement calls by identifying calls within the content that do not have corresponding nodes in the DOM hierarchy as a result of the adblocker removing those nodes or preventing those nodes from being constructed. The bypass loader then obfuscates any identified advertisement calls and reissues the obfuscated advertisement calls to the bypass proxy 220. Obfuscating the advertisement calls is described with reference to FIG. 4 below. The bypass proxy 220 address is continually changed to ensure that the address is not within the adblockers' blacklists. As such, the obfuscated advertisement calls will not be blocked. However, some adblockers prevent calls to any third party domain including the domain specified in the bypass proxy 220 address. To overcome such restriction, some embodiments direct the obfuscated advertisement call to an address of a load balancer or other server operated by the first party content publisher 210. The load balancer or other server is configured to identify any obfuscated advertisement calls and either forward those calls to the bypass proxy 220 or perform the bypass proxy 220 operation by incorporating the bypass operation 220 functionality within the first party content publisher's own servers.

In FIG. 2, the bypass proxy 220 receives (at 260) an obfuscated advertisement call. In some embodiments, the obfuscated advertisement call includes the original advertisement call or the original link (e.g., URL) used in requesting the advertisement from the advertisement server 215. Accordingly, the bypass proxy 220 extracts the original advertisement call from the obfuscated advertisement call, requests the original advertisement from the advertisement server 215 as a result of issuing the original advertisement call, and retrieves (at 265) the original advertisement from the advertisement server 215. The bypass proxy 220 then forwards (at 270) the advertisement to the bypass loader running on the user device 205.

In some embodiments, the bypass proxy 220 may cache a copy of the advertisement such that future requests for that advertisement can be satisfied from cache without having to access the advertisement server 215. A time-to-live parameter may be provided to invalidate the cached copy of the advertisement and cause the bypass proxy 220 to retrieve another copy of the advertisement from the advertisement server 215 upon its expiration.

The bypass loader 205 reintroduces the advertisement that the adblocker removed back into the presentation or rendering of the content. In some embodiments, the bypass loader 205 reintroduces the advertisement by manipulating (at 275) the DOM hierarchy. In some embodiments, manipulating the DOM hierarchy involves inserting a node for the advertisement into the hierarchy with the attributes specified by the content provider for presenting the advertisement as part of the content rendering. The user device 205 resumes its normal operation and renders the content based on the modified DOM hierarchy. The resulting content rendering will include the advertisement that was originally intended by the content publisher 210 despite the operation of the adblocker running on the user device 205.

The bypass proxy 220 also accesses the copy of the content stored by the content publisher in order to modify (at 280) the advertisement call in the content. In some embodiments, the modification involves changing the source address or link of the advertisement call within the content to a modified address or link that is not within the adblocker blacklist. In some embodiments, the modification involves changing the advertisement call from requesting the advertisement from the advertisement server 215 to requesting the advertisement from the bypass proxy 220 with the original request to the advertisement server 215 being encrypted and included as part of the modified advertisement call. Different aliases or addresses for the bypass proxy 220 can be used to ensure that the adblockers do not prevent access of the user device 205 to the bypass proxy 220.

Figure 3:
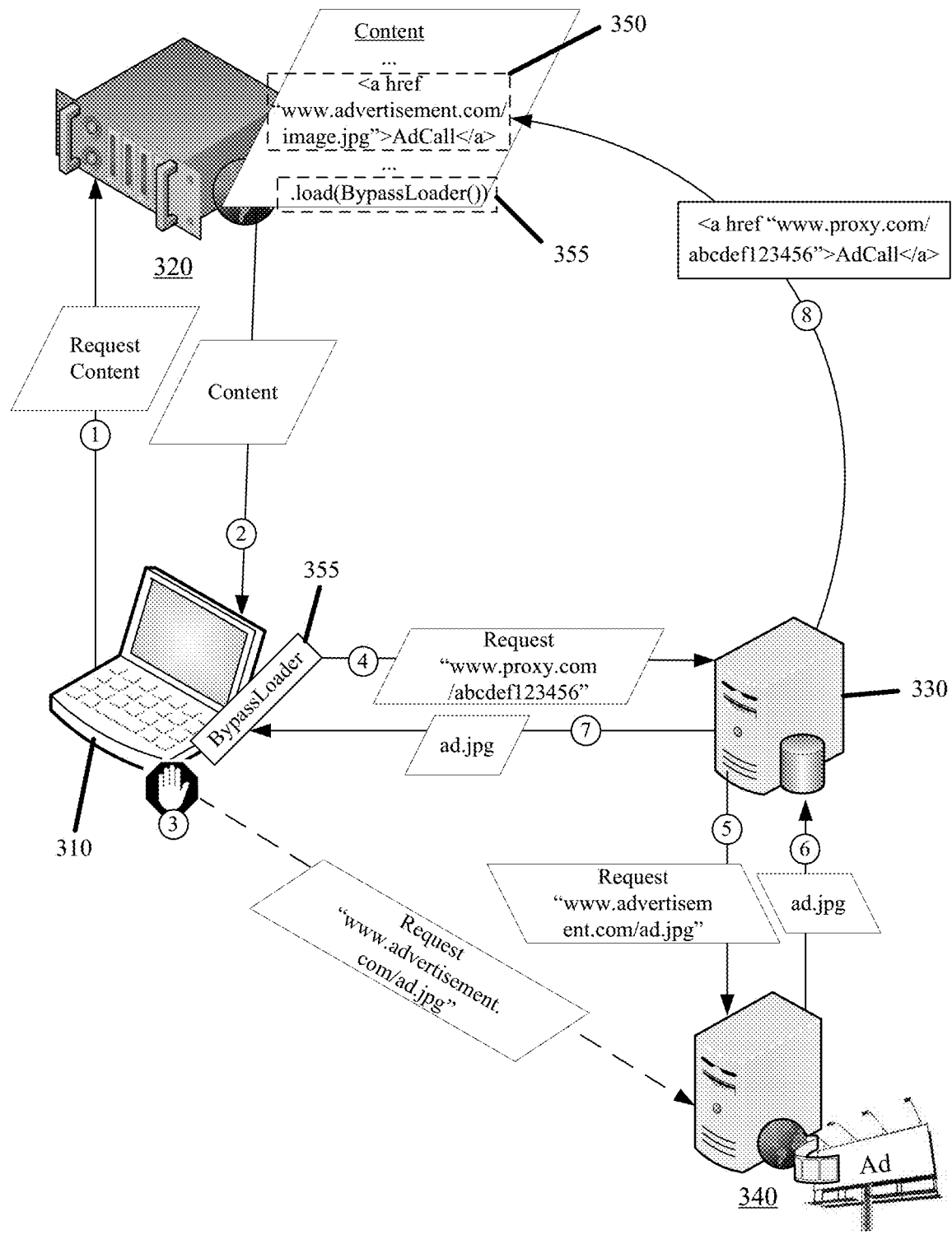
FIG. 3 conceptually illustrates operation of the adblocking bypass system in accordance with some embodiments.

FIG. 3 conceptually illustrates operation of the adblocking bypass system in accordance with some embodiments. Specifically, the figure illustrates operation between a user device 310, a remote site 320 hosting content publisher content, a bypass proxy 330, and an advertisement server 340.

The content publisher content includes at least an advertisement call 350 for including an advertisement as part of the content publisher content and a script for running the bypass loader 355 of some embodiments. In this figure, the advertisement call 350 is an HTML "a href" attribute specifying an advertisement URL for retrieving the advertisement from the advertisement server 340. The advertisement URL is "www.advertisement.com/ad.jpg". As before, the bypass loader 355 script is configured to execute after the load event on the user device 310 fires during the processing and rendering the content.

The user device 310 requests and receives the content publisher content from the remote site 320. The request can be issued by invoking a link, directing a browser of the user device 310 to the address of the site, or launching any application that loads the content publisher content. The content request is typically issued as a HyperText Transfer Protocol (HTTP) GET request with a URL identifying an address of the site 320 and the content being requested.

Upon receiving the content, an adblocker running on the user device 310 blocks the advertisement call 350. This may be due to the address (i.e., domain name) of the advertisement server 340 specified as part of the advertisement call being within the adblocker's blacklist.

After the user device 310 loads the content objects, the load event fires. Consequently, the bypass loader 355 script is invoked and the bypass loader 355 begins its operation. The bypass loader 355 detects the adblocker running on the user device 310 and the advertisement call that was blocked by the adblocker. The bypass loader 355 then obfuscates the advertisement call and issues the obfuscated advertisement call to the bypass proxy 330. As shown in FIG. 3, the obfuscated advertisement call is specified as "www.proxy.com/abcdef123456", wherein "proxy.com" is the domain name pointing to the bypass proxy 330 and the "abcdef123456" parameter encrypts the original advertisement call to "www.advertisement.com/adjpg". The obfuscated advertisement call can be issued by the user device 310 because the bypass proxy 330 domain name is not within the adblocker blacklist and therefore will not be blocked. In some embodiments, included with the obfuscated advertisement call is a query string argument to inform the bypass proxy 330 that an adblocker was detected on the user device 310. An example of the query string argument is "adblock=true". In some embodiments, included with the obfuscated advertisement call is an HTTP header to forward the user device IP address to the bypass proxy 330.

When the bypass proxy 330 receives the obfuscated advertisement call, it decrypts the original advertisement URL from obfuscated advertisement call. Then using the original advertisement call, the bypass proxy 330 requests and retrieves the original advertisement from the advertisement server 340. The bypass proxy 330 returns the advertisement to the bypass loader 355 which then reintroduces the advertisement into the final rendering or presentation of the retrieved content as was intended by the content publisher.

The bypass proxy 330 may also modify the content hosted by site 320 so to avoid blocking of the embedded advertisement calls in the future. As shown, the bypass proxy 330 modifies the content by modifying the advertisement call to specify the proxy URL instead of the original advertisement URL.

To avoid the bypass proxy 330 address from being blacklisted and the obfuscated calls generated to the bypass proxy 330 from being blocked, the adblocking bypass system of some embodiments continually or dynamically changes the bypass proxy 330 address. In some embodiments, the address is automatically changed. In some such embodiments, the bypass loader includes an address generation engine that generates an address of bypass proxy 330 based on a hash of a shared key, a date, or timestamp. The resulting hash can be a temporary domain name that points to the bypass proxy 330. For example, a new domain name resolving to the bypass proxy 330 can be generated daily. The same address generation engine is run for the bypass proxy 330 to dynamically configure any routers or authoritative Domain Name System (DNS) servers that resolve the temporary domain names to the bypass proxy 330. This can include changing an A record, canonical name (CNAME), or alias of the routers or DNS servers used to resolve the temporary domain names to the bypass proxy 330 IP address. As noted above, an alternative is generate obfuscated calls that address the first party content publisher from which the content is received, with the first party publisher redirecting the obfuscated call to the bypass proxy 330. Specifically, local URLs are configured at the first party content publisher to redirect to the bypass proxy 330 and the bypass loader 355 generates obfuscated calls addressed to one of the local URLs.

Figure 4:
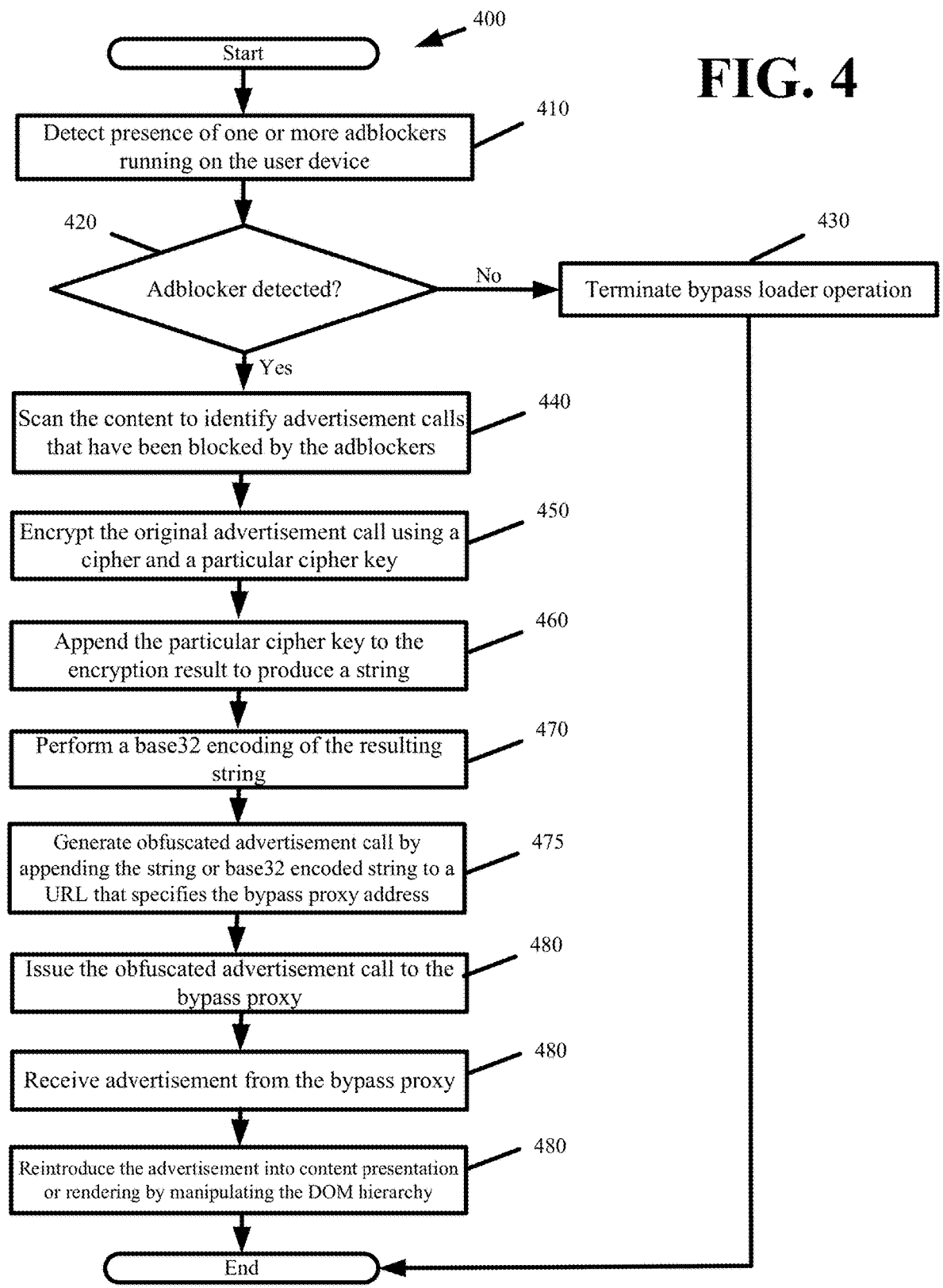
FIG. 4 presents a process performed by the bypass loader for counteracting the advertisement intercepting and blocking of adblockers in accordance with some embodiments.

FIG. 4 presents a process 400 performed by the bypass loader for counteracting the advertisement intercepting and blocking of adblockers in accordance with some embodiments. The process begins when the bypass loader is invoked as a result of firing the load event.

The process detects (at 410) presence of one or more adblockers on the user device on which the bypass loader executes. As noted above, this can be accomplished based on the presence or absence of a specific advertisement tag that is required to return before the load event can be fired. If an adblocker was running on the user device, the adblocker would remove or block that specific advertisement tag and the absence of which would indicate to the bypass loader that an adblocker is in fact running. In some embodiments, the bypass loader detects the presence of an adblocker by identifying that dimensions of an advertisement have been set to zero such that they are not visible.

If no adblocker is detected (at 420), the process terminates (at 430) operation of the bypass loader and the content is rendered on the user device without any changes. However, if one or more adblockers are detected (at 420), the process scans (at 440) the content to identify advertisement calls that have been or could be blocked by the adblockers.

For each identified original advertisement call that is or may be blocked by an adblocker, the process produces an obfuscated advertisement call. The process produces the obfuscated advertisement call by encrypting (at 450) the original advertisement call using a cipher and a particular cipher key. The process appends (at 460) the particular cipher key to the encryption result yielding a string of potentially arbitrary length. The particular cipher key may be a fixed size (e.g., five characters) such that the bypass proxy is able to later identify and extract the particular cipher key from the string. The process optionally performs (at 470) a base32 encoding of the resulting string to ensure the string is formatted as a proper URL query string argument or pathname. The process then appends (at 475) the string or base32 encoded string containing the encrypted original advertisement call and particular cipher key to a URL that specifies the bypass proxy address (e.g., IP address or domain name). The bypass proxy address appended with the string containing the original advertisement call and the particular cipher key yield the obfuscated advertisement call. The process issues (at 480) the obfuscated advertisement call to the bypass proxy.

As noted above, certain adblockers, when rendering content of a particular content publisher, may block any calls that are issued to any third party domain that deviates from the domain of that particular content publisher. In such cases, the bypass proxy address of the obfuscated advertisement call can specify an address to a load balancing server or other server of the particular content publisher that operates in concert with the adblocking bypass system of some embodiments. Thus, the bypass loader sends the obfuscated advertisement call to a load balancer or other machine of the content publisher to avoid the adblocker from blocking the call. The load balancer then identifies the obfuscated advertisement call and forwards it to the bypass proxy. Alternatively, the load balancer or other machine of the content publisher can directly incorporate and perform the bypass proxy functionality such that the bypass proxy address can address that load balancer or other content publisher machine without any further redirection.

The bypass proxy reverses the bypass loader operations to extract the original advertisement call from the obfuscated advertisement call, request the advertisement from the appropriate advertisement server using the original advertisement call, and return the advertisement to the bypass loader. Accordingly, the process receives (at 490) the advertisement from the bypass proxy and reintroduces (at 495) the advertisement as part of the content presentation or rendering. As noted above, the process can reintroduce the advertisement by manipulating the DOM hierarchy. The process then ends.

Figure 5:
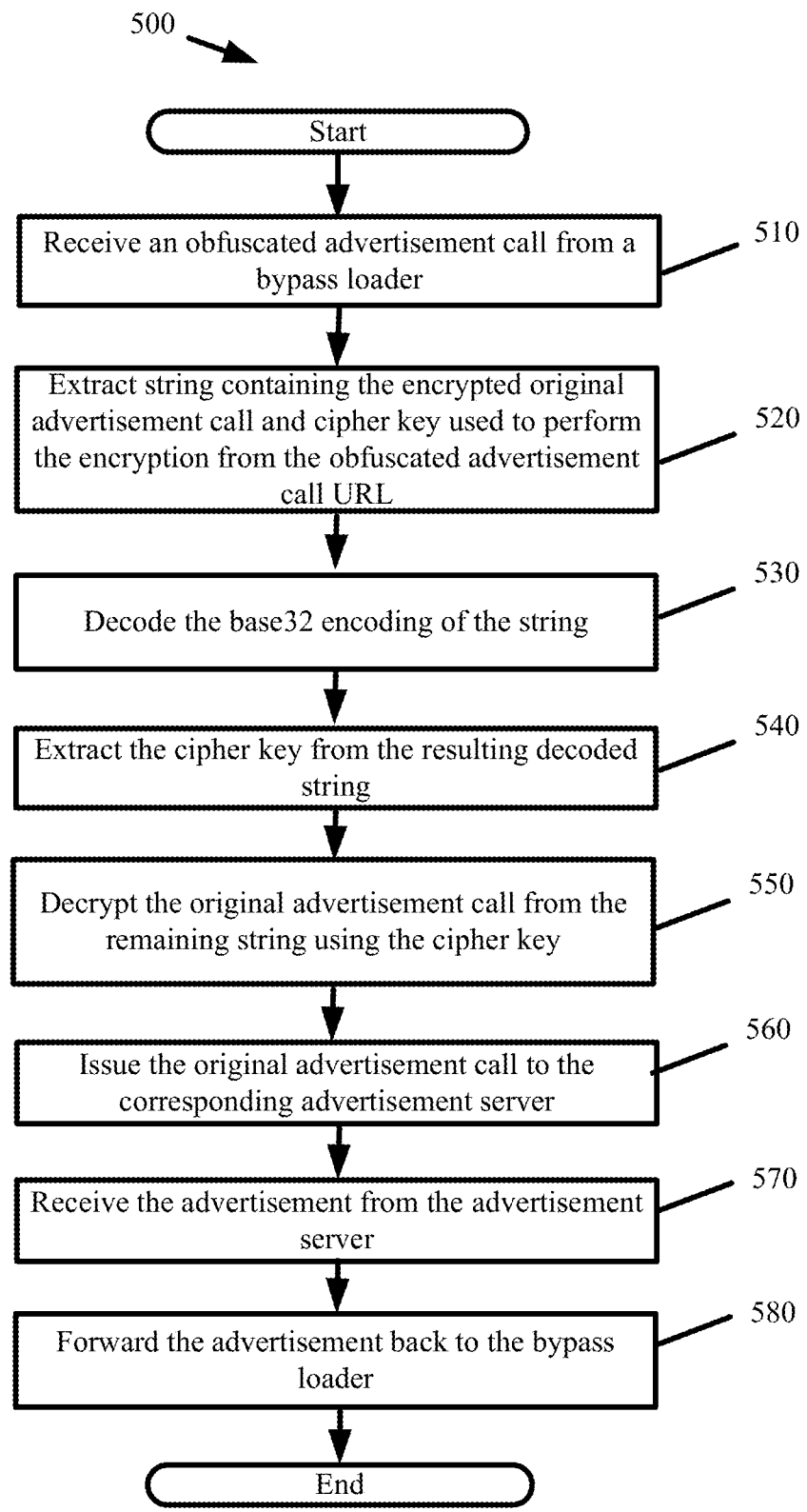
FIG. 5 presents a process performed by the bypass proxy for retrieving an advertisement on behalf of an instance of the bypass loader in accordance with some embodiments.

FIG. 5 presents a process 500 performed by the bypass proxy for retrieving an advertisement on behalf of an instance of the bypass loader in accordance with some embodiments. The process 500 commences when the bypass proxy receives (at 510) an obfuscated advertisement call from a bypass loader. The process extracts (at 520) the string containing the encrypted original advertisement call and cipher key used to perform the encryption from the obfuscated advertisement call URL. The process decodes (at 530) the base32 encoding of the string if one was applied. The process extracts (at 540) the cipher key from the resulting decoded string. As noted above, the cipher key will be some fixed number of symbols or alphanumeric characters at the end of the string. The process decrypts (at 550) the original advertisement call from the remaining string using the cipher key. The process then issues (at 560) the original advertisement call to the corresponding advertisement server on behalf of the bypass loader. The process receives (at 570) the advertisement in response. Lastly, the process forwards (at 580) the advertisement back to the bypass loader that initially passed the obfuscated advertisement call to the bypass proxy.

In some embodiments, the bypass proxy preserves the ability of the advertisement server to track the user devices that receive the advertisements served by the advertisement server. To do so, step 560 above can be modified such that when the bypass proxy issues the original advertisement call to the advertisement server, the bypass proxy forwards the user device information to the advertisement server. Specifically, the bypass proxy reads the request header encapsulating the original advertisement call to extract identifying information about the user device including the user device IP address. The identifying information is then forwarded in the advertisement call that the bypass proxy submits to the advertisement server on behalf of the user device. The advertisement server can then track the true recipient for the advertisement. Similarly, when forwarding the advertisement back to the bypass loader at step 580, the bypass proxy can submit the advertisement with the header provided by the advertisement server which may include a cookie or other tracking information.

Figure 6:
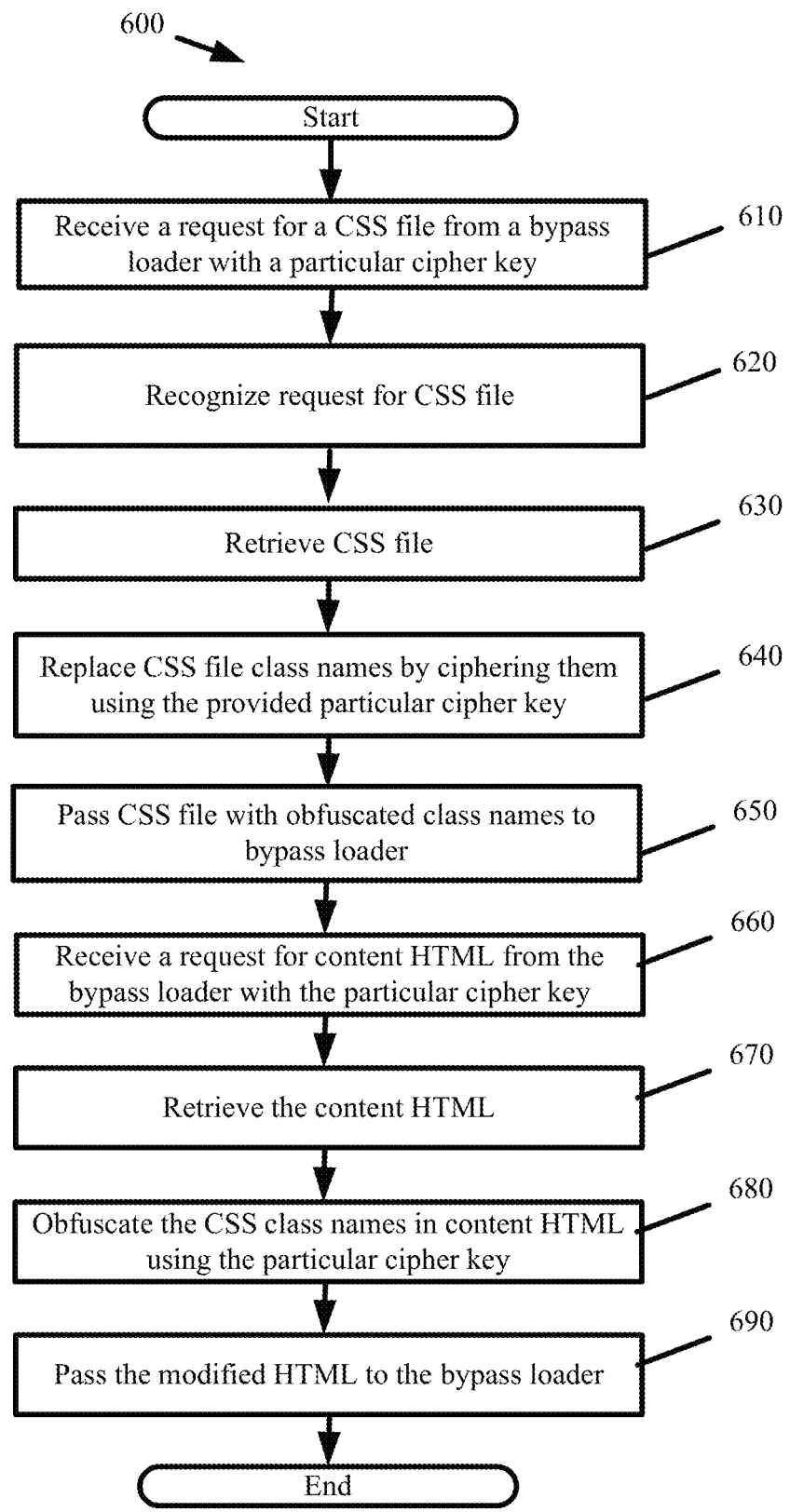
FIG. 6 presents a CSS translation process for circumventing CSS blocking by adblockers in accordance with some embodiments.

Some adblockers perform a more aggressive secondary or alternative routine to prevent the display of advertisements. They do so by blocking elements matching certain CSS selectors. The adblocking bypass system of some embodiments circumvents this adblocking operation by using the bypass loader to insert random zero space elements (i.e., elements that are invisible on the page) to change the DOM ordering. In so doing, the bypass loader is able to vary or otherwise modify the sought after selectors. An alternative method to circumvent CSS selector blocking is described with reference to the CSS translation process 600 of FIG. 6.

The process commences with the bypass proxy receiving (at 610) a request for a CSS file from a bypass loader with a particular cipher key specified on the URL request. The bypass proxy recognizes (at 620) the request for the CSS file, retrieves (at 630) the CSS file, and searches through it to replace (at 640) all class names with a ciphered version using the provided particular cipher key before passing (at 650) the CSS file with the obfuscated class names to the bypass loader. The process then receives (at 660) a request for the content HTML from the bypass loader again with the same cipher key. The process retrieves (at 670) the content HTML and performs the same ciphering to obfuscate (at 680) the CSS class names therein to match the changed names of the CSS file. The process passes (at 690) the modified HTML to the bypass loader which can then render the content in a manner that prevents the CSS and any included advertisement therein from being blocked.

Many of the above-described processes and components are implemented as software processes that are specified as a set of instructions recorded on non-transitory computer-readable storage medium (also referred to as computer-readable medium). When these instructions are executed by one or more computational element(s) (such as processors or other computational elements like ASICs and FPGAs), they cause the computational element(s) to perform the actions indicated in the instructions. Server, computer, and computing machine are meant in their broadest sense and may include any electronic device with a processor that executes instructions stored on computer-readable media or that are obtained remotely over a network connection. Examples of computer-readable media include, but are not limited to, CD-ROMs, flash drives, RAM chips, hard drives, EPROMs, etc. Further, wherever a server or device is identified as a component of the embodied invention, it is understood that the server may be a single physical machine, or a cluster of multiple physical machines performing related functions, or virtualized servers co-resident on a single physical machine, or various combinations of the above.

FIG. 7 illustrates a computer system or server with which some embodiments of the bypass system are implemented. Such a computer system includes various types of computer-readable mediums and interfaces for various other types of computer-readable mediums that implement the processes described herein. Computer system 700 includes a bus 705, a processor 710, a system memory 715, a read-only memory 720, a permanent storage device 725, input devices 730, and output devices 735.

The bus 705 collectively represents all system, peripheral, and chipset buses that communicatively connect the numerous internal devices of the computer system 700. For instance, the bus 705 communicatively connects the processor 710 with the read-only memory 720, the system memory 715, and the permanent storage device 725. From these various memory units, the processor 710 retrieves instructions to execute and data to process in order to execute the processes of the invention. The processor 710 is a processing device such as a central processing unit, integrated circuit, graphical processing unit, etc.

The read-only-memory (ROM) 720 stores static data and instructions that are needed by the processor 710 and other modules of the computer system. The permanent storage device 725, on the other hand, is a read-and-write memory device. This device is a non-volatile memory unit that stores instructions and data even when the computer system 700 is off. Some embodiments of the invention use a mass-storage device (such as a magnetic or optical disk and its corresponding disk drive) as the permanent storage device 725.

Other embodiments use a removable storage device (such as a flash drive) as the permanent storage device. Like the permanent storage device 725, the system memory 715 is a read-and-write memory device. However, unlike the storage device 725, the system memory is a volatile read-and-write memory, such as random access memory (RAM). The system memory stores some of the instructions and data that the processor needs at runtime. In some embodiments, the processes are stored in the system memory 715, the permanent storage device 725, and/or the read-only memory 720.

The bus 705 also connects to the input and output devices 730 and 735. The input devices enable the user to communicate information and select commands to the computer system. The input devices 730 include, but are not limited to, alphanumeric keypads (including physical keyboards and touchscreen keyboards) and pointing devices. The input devices 730 also include audio input devices (e.g., microphones, MIDI musical instruments, etc.). The output devices 735 display images generated by the computer system. The output devices include, but are not limited to, printers and display devices, such as cathode ray tubes (CRT) or liquid crystal displays (LCD).

Finally, as shown in FIG. 7, bus 705 also couples computer 700 to a network 765 through a network adapter (not shown). In this manner, the computer can be a part of a network of computers (such as a local area network ("LAN"), a wide area network ("WAN"), or an Intranet, or a network of networks, such as the Internet.

As mentioned above, the computer system 700 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable blu-ray discs, and any other optical or magnetic media.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A computer-implemented method for ensuring presentation of content from external destinations on a user device despite execution of a blocker running on the user device, the computer-implemented method comprising:
    receiving at the user device, a base page from a host in response to a request from the user device;

detecting at the user device and in the base page, an unencrypted particular call for content comprising one of a Uniform Resource Locator (URL), Cascade Style Sheet (CSS) selector, or HyperText Markup Language (HTML) element with a first domain name of a first destination, that is different than the host, and a path to the content provided by the first destination;

encrypting, by operation of the user device, the first domain name and the path of the unencrypted particular call as an encrypted string using a cipher key in response to said receiving the base page with the unencrypted particular call at the user device from the host;

rewriting, by operation of the user device, the URL, the CSS selector, or the HTML element of the unencrypted particular call as an obfuscated call comprising (i) a second domain name of a second destination, that is different than the first domain name of the first destination of the unencrypted particular call, and (ii) the encrypted string, that encrypts the first domain name of the first destination and the path to the content, as a path of the obfuscated call;

receiving the content from the second destination at the user device in response to issuing said obfuscated call from the user device to the second destination; and inserting the content into a presentation or rendering on the user device.

2. The computer-implemented method of claim 1, wherein the first destination is within a blacklist of the blocker and the second destination is not within the blacklist.

3. The computer-implemented method of claim 1 further comprising sending a request for the content, that is decrypted from the obfuscated call, from the second destination to the first destination in response to the user device issuing the obfuscated call to the second destination.

4. The computer-implemented method of claim 3, wherein sending the request comprises decoding at the second destination, the first domain name of the first destination and the path to the content from the encrypted string of the obfuscated call.

5. The computer-implemented method of claim 3 further comprising changing a filename or path identified from the encrypted string of the obfuscated call to a filename of the content at the second destination and passing said content from the second destination to the user device.

6. The computer-implemented method of claim 1, wherein the obfuscated call further comprises the cipher key as part of the path with the encrypted string.

7. The computer-implemented method of claim 1, wherein rewriting the URL, the CSS selector, or the HTML element as an obfuscated call further comprises modifying the URL, CSS selector, or HTML element from identifying a first type of content to identifying a different second type of content.

8. The computer-implemented method of claim 1, wherein rewriting the URL, the CSS selector, or the HTML element as the obfuscated call further comprises dynamically generating the second domain name for the second destination based on at least a hash of a shared key.

9. The computer-implemented method of claim 8 further comprising changing a router or authoritative Domain Name System (DNS) server configuration to link the second domain name to the second destination prior to issuing the obfuscated call.

10. The computer-implemented method of claim 8, wherein generating the second domain name is further based on a periodically changing timestamp.

11. The computer-implemented method of claim 8 further comprising changing at least one of a DNS A record, canonical name (CNAME), or alias of the second destination to the second domain name during a first time period in which the obfuscated call is issued.

12. The computer-implemented method of claim 8, wherein the second destination retrieves the content of the unencrypted particular call from the first destination and returns said content to the user device in response to the user device issuing the obfuscated call to the second destination.

13. The computer-implemented method of claim 1 further comprising adding said cipher key to the encrypted string.

14. The computer-implemented method of claim 1, wherein detecting the unencrypted particular call further comprises determining that the unencrypted particular call is blocked on the user device based on a Document Object Model of the base page missing a node for the unencrypted particular call.

15. The computer-implemented method of claim 1 further comprising executing, on the user device, a script that is embedded in the base page, wherein executing the script comprises performing said detecting and rewriting on the user device.

16. A user device comprising:
one or more processors configured to:
receive a base page from a host in response to a request from the user device;
detect in the base page, an unencrypted particular call for content comprising one of a Uniform Resource Locator (URL), Cascade Style Sheet (CSS) selector, or HyperText Markup Language (HTML) element with a first domain name of a first destination, that is different than the host, and a path to the content provided by the first destination;
encrypt the first domain name and the path of the unencrypted particular call as an encrypted string using a cipher key in response to said receiving the base page with the unencrypted particular call at the user device from the host;
rewrite the URL, the CSS selector, or the HTML element of the unencrypted particular call as an obfuscated call comprising a second domain name of a second destination, that is different than the first domain name of the first destination of the unencrypted particular call, and (ii) the encrypted string, that encrypts the first domain name of the first destination and the path to the content, as a path of the obfuscated call;
receive the content from the second destination in response to issuing said obfuscated call to the second destination; and
insert the content into a presentation or rendering on the user device.

17. A non-transitory computer-readable medium of a user device, storing a set of processor-executable instructions, which, when executed by one or more processors of the user device, cause the one or more processors to:
receive a base page from a host in response to a request from the user device;
detect in the base page, an unencrypted particular call for content comprising one of a Uniform Resource Locator (URL), Cascade Style Sheet (CSS) selector, or HyperText Markup Language (HTML) element with a first domain name of a first destination, that is different than the host, and a path to the content provided by the first destination;

encrypt the first domain name and the path of the unencrypted particular call as an encrypted string using a cipher key in response to said receiving the base page with the unencrypted particular call at the user device from the host;

rewrite the URL, the CSS selector, or the HTML element of the unencrypted particular call as an obfuscated call comprising (i) a second domain name of a second destination, that is different than the first domain name of the first destination of the unencrypted particular call, and (ii) the encrypted string, that encrypts the first domain name of the first destination and the path to the content, as a path of the obfuscated call;

receive the content from the second destination in response to issuing said obfuscated call to the second destination; and insert the content into a presentation or rendering on the user device.

\* \* \* \* \*